Feb. 6, 1945.　　　　　M. C. KEES　　　　　2,368,843
CLAMP
Filed May 10, 1943
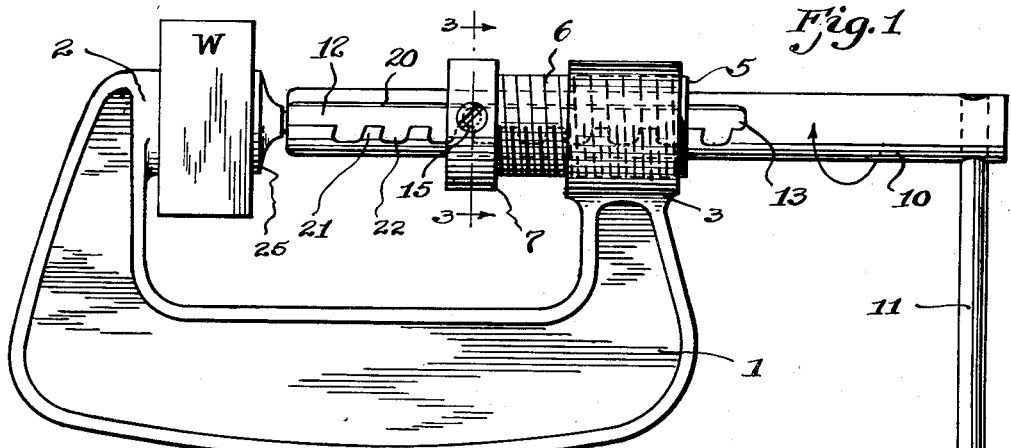
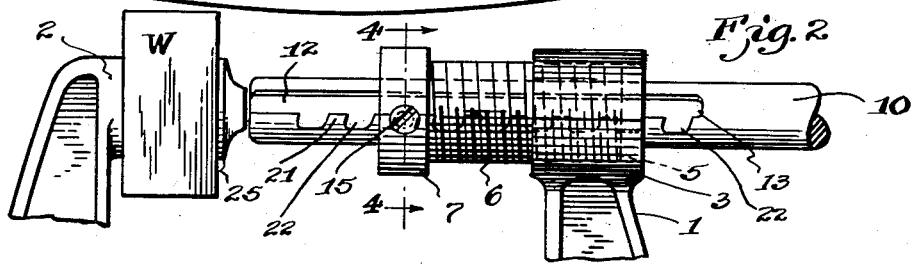
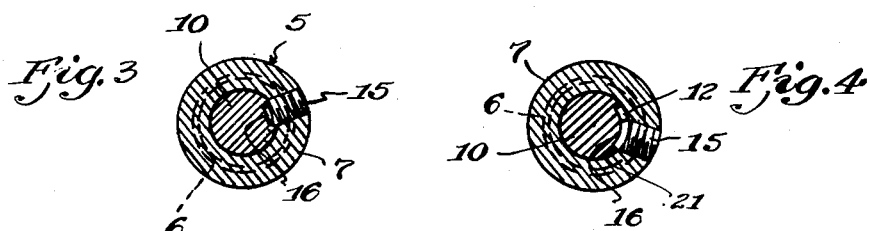
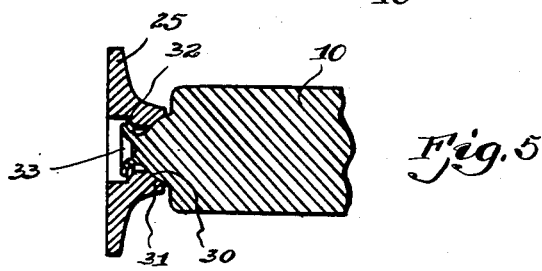
INVENTOR.
Marshall C. Kees
BY Berner, Kissell, Laughlin & Roisch
Attorneys.

Patented Feb. 6, 1945

2,368,843

UNITED STATES PATENT OFFICE 2,368,843

CLAMP

Marshall C. Kees, Detroit, Mich., assignor of one-half to Thomas E. Jackson, Detroit, Mich.

Application May 10, 1943, Serial No. 486,287

1 Claim. (Cl. 74—424.8)

This invention relates to clamps and it has to do particularly with a quick action clamp which can be easily and quickly applied to the work and manipulated to grip the work with pressure.

In accordance with the invention a structure is provided wherein the clamp element or pressure bar has two types of adjusting movement which may be termed major and minor movements for first applying the clamp to the work and then subjecting the work to pressure. To this end, the moveable element or pressure bar may have a sliding movement as the major type of adjustment and a rotary movement involving a screw thread action for applying the clamping pressure.

It is appreciated that it has been heretofore proposed to provide a clamp wherein the pressure bar could be first roughly adjusted to a proper position and then by means of a turning screw thread action applied to the work with pressure. The present invention aims to provide an improved clamp and construction thereof to accomplish the combined motion and adjusting features in substantially a single motion given to the clamp structure by an operator. To this end there is a substantially automatic action in that the sliding motion of the pressure bar may be given to the pressure bar by the operator and then by a turning motion the relative sliding relationship is automatically locked to then bring the screw action into play.

A clamp for carrying out the invention is described in the accompanying drawing. In the drawing:

Fig. 1 is a side elevational view of a clamp constructed in accordance with the invention showing the clamp initially applied to a piece of work.

Fig. 2 is a partial side elevational view similar to Fig. 1 showing a clamp applied to the work on line 4—4 of Fig. 2.

Fig. 3 is a sectional view on line 3—3 of Fig. 1.

Fig. 4 is a sectional view on line 4—4 of Fig. 2.

Fig. 5 is a sectional view showing the arrangement at the end of the pressure bar with the pressure foot applied thereto.

The clamp as shown in Fig. 1 has a body or frame of C shape as generally indicated at 1, with one arm of the C constituting a clamping portion or abutment, the other portion as at 3 being internally threaded. The work or piece to be clamped is shown at W and in Figs. 1 and 2, the work is positioned in the clamp.

A bushing 5 provided with exterior threads at 6 is mounted in the arm 3 with the thread 6 of the bushing interfitting the thread in the arm 3. This bushing may be provided with an enlarged end or collar 7. This structure is such that the bushing may be readily and easily rotated in its mounting on the screw threads so that in one direction of rotation it may be advanced toward the abutment 2 and in the opposite direction of rotation it may be retracted from abutment 2.

A pressure bar is indicated at 10 and it may be provided with a suitable handle 11 by means of which it may be reciprocated and rotated. This pressure bar has a rotatable and sliding fit within the bushing. Extending lengthwise in the pressure bar is a slot or key-way 12 which may extend through the end of the bar next adjacent the abutment 2 and which may terminate short of the opposite end of the bar as at 13. The bushing is provided with a key or pin for operating in the keyway. As illustrated, this key or pin may take the form of a screw 15 threaded in the collar 7 and having a projecting end 16 which lies in the key-way 12.

The key-way 12 is preferably defined by a straight or axial wall 20 on one side and a series of alternating teeth and recesses on the opposite side. The teeth are illustrated at 21 and the intervening recesses are shown at 22. Advantageously the teeth are slightly under-cut or inclined on one side, this being the righthand side as Fig. 1 is viewed, the purpose for which will presently appear. Moreover, where a righthand thread is used on the bushing, the straight wall 20 of the groove should be on that side of the groove which is leading when the pressure bar is rotated in the righthand direction as shown by arrow in Fig. 1. This direction of rotation advances the pressure bar toward the abutment 2.

A pressure foot 25 is preferably mounted on the end of the pressure bar for direct engagement with the work. This pressure foot as shown in Fig. 5 preferably has a limited amount of universal movement relative to the pressure bar so that it may set flatly against a work piece which may have a surface not accurately at right angles to the axis of the pressure bar. To this end, the pressure bar has a semi-spherically shaped seat 30, while the foot has a correspondingly shaped internal seat 31 to give a ball and socket type of mounting. There is an opening in the pressure foot provided with a shoulder 32, and projecting from the end of the semi-spherical seat 30 is a teat or extension 33 which may be peened or flattened to loosely attach the foot to the pressure bar. It will be noted that there is considerable looseness in the attachment of the pressure bar and the foot so that a limited amount of universal movement is provided.

In the operation of the clamp the work may be positioned as shown in Fig. 1 and then the operator may push the pressure bar to the left as Fig. 1 is moved to bring the foot up against the work. In this action the key portion 16 slides in the slot 12. Now the operator turns the pressure bar righthandedly and this causes a turning of the bushing 6. As a result the bushing advances toward the work while the pressure bar may initially remain axially stationary since it abuts the work. An advantageous example of dimensions may be given at this point, although these dimensions may vary with clamps of different sizes and may vary with clamps for different purposes regardless of size. In this example, the dimensions axially of one of the teeth 21 may be about 3/32 of an inch. The dimension axially of one of the grooves may be 9/32 of an inch. The threads employed on the bushing may, for example, be about 10 to an inch. Accordingly, it will be observed that approximately three revolutions of the pressure bar is sufficient for moving the key 16 across one tooth and one notch. The invention is not limited to these dimensions.

In Fig. 1, key 16 is in alignment substantially with the righthand edge of one tooth as shown. Now as the pressure bar is rotated righthandedly, this contact with the key 16 causes the bushing to rotate and the bushing is advanced toward the work. Ultimately the key 16 will advance to the left until it moves off the tooth whereupon continued rotation of the pressure bar may occur while the bushing may be stationary until the key portion 16 abuts the bottom of the adjacent notch. Thereupon continued rotation of the pressure bar results in rotation of the bushing with the key portion remaining in the notch and ultimately the key portion comes into an abutting engagement with next leftwise tooth thereby forcing the pressure bar into a clamping engagement with the work. The fact that the teeth are slightly inclined or under-cut insures against the possibility of the key portion 16 from becoming disengaged with the tooth after a clamping action has been accomplished. The clamping position is shown in Fig. 2. Figs. 1 and 2 illustrate approximately the relative positions which require the maximum number of revolutions to be imparted to the pressure bar for clamping purposes, this being about three revolutions in accordance with the example above given. If, when the pressure bar is applied to the work by the sliding action the key position 16 is in any position to the left as Fig. 1 is viewed but not beyond the next adjacent tooth the number of revolutions or partial revolutions will be correspondingly decreased.

When the work is to be released the pressure bar is rotated lefthandedly and a partial revolution is all that is necessary to release the pressure engagement between the key portion 16 and the tooth engaged thereby whereupon the key portion moves into the key-way 12 and the pressure bar may be retraced with a sliding motion. If the same size piece of work is to be engaged, the presssure bar is pushed up against the work and at this time the key portion 16 is substantially in alignment with the same notch, with the result that as the pressure bar is rotated righthandedly the notch moves so as to engage the key portion 16 therein and pressure on the work may be applied by only a partial revolution of the pressure bar. This latter example gives a condition of the least amount of turning of the pressure bar while Fig. 1 substantially shows a condition requiring the maximum amount of turning of the pressure bar, and between these two positions there may be any number of conditions.

The automatic action or automatic nature of the action will be appreciated from a consideration of the above description. There is but a single manipulating adjustment required of the operator. The operator pushes the pressure bar against the work as by means of the handle and turns the handle righthandedly to apply the pressure engagement. It will be seen that to accomplish this, at the tooth formation 21—22 must be on the side of the groove 12 which is trailing the side 20 of the groove when the pressure bar is turned righthandedly a righthand thread is used. If a lefthand thread should be desirable for any purpose than the position of the notch formation in the groove 12 would be reversed.

I claim:

In a clamp; a body having a supporting portion, a bushing threaded in the portion, a bar having a sliding fit in the bushing, a keyway in the bar, a key member on the bushing operating in the key-way, one side of the key-way being defined by a substantially straight wall, a formation of alternate teeth and notches along the opposite side of the key-way, the key-way and key member serving to control a limited amount of relative rotation between the bushing and the bar, the bar being slidable in the bushing with the key member sliding in the key-way, said bar being turnable to in turn rotate the bushing, whereby when the key member is in a notch, the bar is advanced in accordance with the bushing threads, the tooth and notch formation being on the side of the key-way which trails the straight side of the key-way when the bar is rotated in a direction which advances the bar and bushing, whereby the bar turns relative to the bushing to automatically engage the key member in a notch as the key member and notch come into alignment.

MARSHALL C. KEES.